United States Patent [19]
Han

[11] Patent Number: 5,659,435
[45] Date of Patent: Aug. 19, 1997

[54] METHOD FOR CONTROLLING TAPE RUNNING

[75] Inventor: Jae-Seong Han, Seoul, Rep. of Korea

[73] Assignee: Samsung Electronics Co., Ltd., Kyungki-Do, Rep. of Korea

[21] Appl. No.: 518,460

[22] Filed: Aug. 23, 1995

[30] Foreign Application Priority Data

Aug. 23, 1994 [KR] Rep. of Korea .................. 20806/1994

[51] Int. Cl.$^6$ ........................................... G11B 15/48
[52] U.S. Cl. .................. 360/74.2; 360/73.06; 242/333.7
[58] Field of Search .......................... 360/74.2, 73.06, 360/73.07, 73.05, 73.04, 74.1; 242/333.7, 333.6, 333.5

[56] References Cited

U.S. PATENT DOCUMENTS

| | | | |
|---|---|---|---|
| 4,866,547 | 9/1989 | Rodal | 360/74.2 |
| 5,309,300 | 5/1994 | Lee | 360/74.2 |

FOREIGN PATENT DOCUMENTS

| | | | |
|---|---|---|---|
| 30258 | 2/1984 | Japan | 360/74.2 |
| 13155 | 1/1988 | Japan | 360/74.2 |
| 250348 | 9/1993 | Japan | 360/71 |

*Primary Examiner*—Aristotelis M. Psitos
*Assistant Examiner*—Alan Faber
*Attorney, Agent, or Firm*—Sughrue, Mion, Zinn, Macpeak & Seas

[57] ABSTRACT

A method for controlling tape running in a tape driving apparatus in which the size of a hub is determined when a tape is inserted into the tape driving apparatus and the number of reference pulses corresponding to one rotation of the reel in an end position of the tape is calculated according to the determined size of the hub. The tape is run and the frequency of rotation of the reel is detected. A comparison is made between the number of pulses of the present reel and the number of reference pulses, and if the number of pulses of the present reel is smaller than the number of reference pulses, the running mode is continuously performed. If, however, the number of pulses of the present reel is larger than the number of reference pulses, then a stop position is judged and the tape running is stopped, resulting in entering into a stand-by mode.

5 Claims, 6 Drawing Sheets

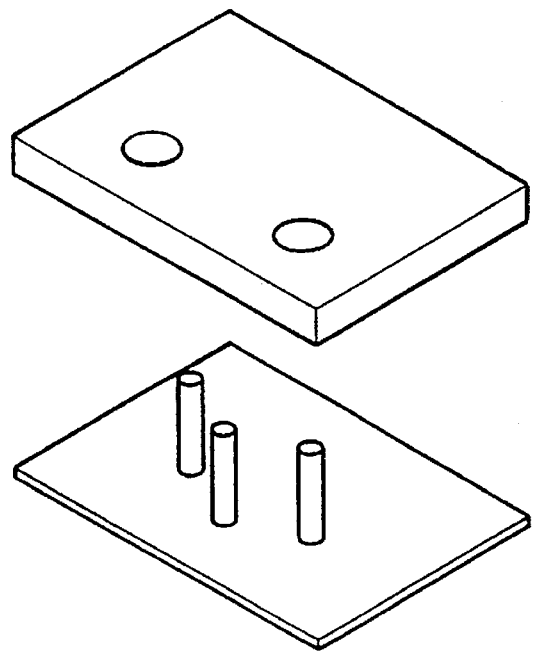
*FIG. 2*  PRIOR ART
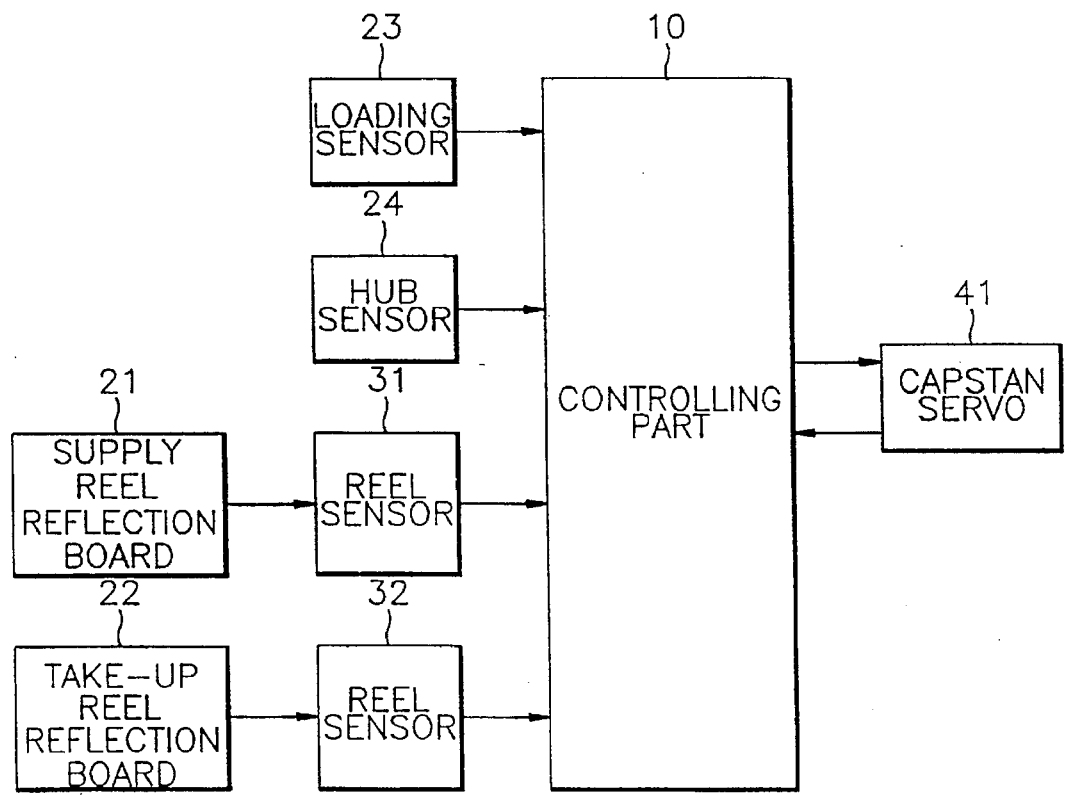
*FIG. 3*

METHOD FOR CONTROLLING TAPE RUNNING

BACKGROUND OF THE INVENTION

The present invention relates to a method for controlling tape running in a tape driving apparatus, and more particularly to a method for stopping the tape running at start and end positions of a tape by analyzing a rotation period of a reel according to a tape running mode.

A tape driving apparatus such as a VCR (Video Cassette Recorder) uses sensors to sense a start/end position of a tape. FIG. 1A depicts an apparatus having sensors for detecting the start and end positions of the tape in the VCR. In FIG. 1, a cassette sensor is arranged in the center of the tape, a start sensor is arranged in a supply reel, and an end sensor is arranged in a take-up reel. As shown in FIG. 1B, there are provided a magnetic area and a lead area in a video tape. The magnetic area in which an image signal is recorded is opaque and the lead area is transparent. Thus, the start and end positions of the video tape are the lead areas.

A prior art apparatus for sensing the start and end positions of the tape, as shown in FIG. 1B, has a light emitting element for the cassette sensor and also has light receiving elements for the start and end sensors. The terminals of the two sensors are connected to a system controlling part. The cassette sensor is always maintained in an emitting state.

When tapes are run, the start and end sensors output different signals according to the magnetic and lead areas of the tape. If the tape remains in the magnetic area, a light signal generated in the cassette sensor is blocked by the tape, so that the start and end sensors are turned off, thus outputting a signal to a controlling part at level VCC. The controlling part controls the running of the tape. However, if the tape remains in the lead area, the light signal generated in the cassette sensor is provided to the start and end sensors through the tape, so that the start and end sensors are turned on, thus outputting a signal to the controlling part at the ground voltage level. The controlling part recognizes whether the tape sensed by the sensor is in the start position or the end position thereof.

However, as mentioned above, the prior art apparatus for sensing the start and end positions of the tape uses three sensors. This results in a complicated fabrication process and high production costs.

Further, according to the prior art tape driving apparatus, as shown in FIG. 2, the sensors are mounted on an upper part of a printed circuit board, so that if a deck is coupled with the printed circuit board, there is a reduction in working efficiency because it is difficult to couple the sensors with the deck.

SUMMARY OF THE INVENTION

It is an object of the invention to provide a method capable of stopping tape running in a tape driving apparatus after a rotation period of a reel is analyzed according to a tape running mode and start and end positions of the tape are thus detected.

It is another object of the invention to provide a method capable of stopping the tape running in the tape driving apparatus after the size of a hub is determined and the rotation period of a reel is analyzed according to the determined hub size to judge start and end positions of the tape.

It is yet another object of the invention to provide a method capable of detecting the start and end positions of the tape in the tape driving apparatus by storing in a table the rotation period of the reel in the end position of the tape according to the size of the hub, and by comparing the rotation period of the reel during a tape running mode with the stored rotation period of the reel.

It is yet another object of the invention to provide a method capable of detecting the start and end positions of the tape in the tape driving apparatus by determining the rotation period of the reel according to the size of the hub by using a neural network, and by comparing a rotation period signal of the reel determined during the tape running mode with the rotation period signal of a present reel.

In order to achieve these objects, the tape running control method of the present invention comprises the steps of: determining the size of the hub of the inserted tape; calculating the number of reference pulses corresponding to one rotation of the reel in the end position of the tape according to the determined size of the hub; performing a tape running mode and then detecting rotation frequency of a present reel; comparing the number of pulses of the present reel and the number of reference pulses, and if the number of pulses of the present reel is smaller than the number of reference pulses, repeatedly performing the tape running mode; and if the number of pulses of the present reel is larger than the number of reference pulses, judging a stopping position of the tape and stopping the tape running to thereby enter a stand-by mode.

BRIEF DESCRIPTION OF THE DRAWINGS

The above and other objects, advantages and features of the present invention will be more apparent from the following detailed description taken with the attached drawings in which:

FIG. 2 is a view illustrating a deck in the prior art tape driving apparatus;

FIG. 3 is a view illustrating constructions of sensors for sensing start and end positions of a tape according to the present invention;

DETAILED DESCRIPTION OF THE PREFERRED EMBODIMENT

Figure 1A:
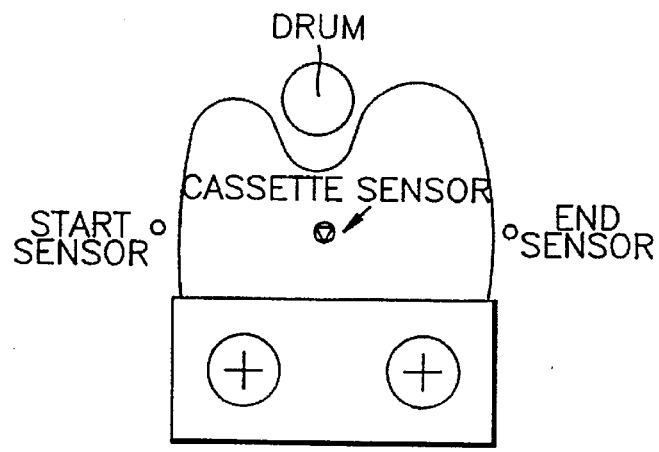
FIGS. 1A and 1B are views illustrating constructions of sensors for sensing start and end positions of a tape in the prior art tape driving apparatus.
Figure 1B:
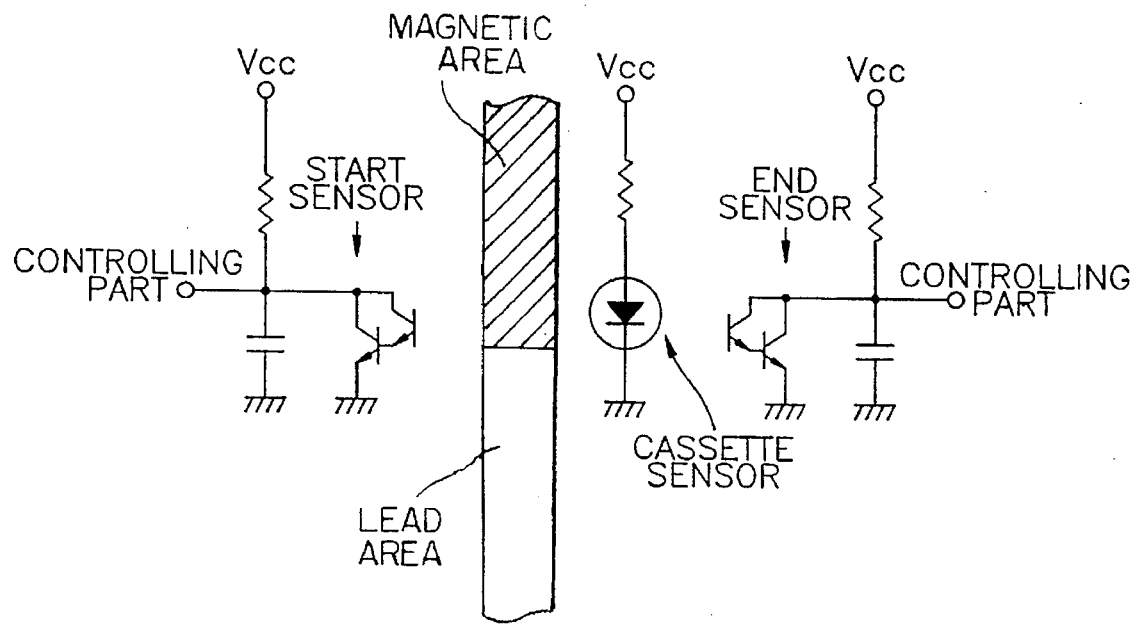

The same elements in the drawings are indicated by the same reference numerals in each of the drawings.

In the following description, specific details such as values of rotation frequency of reels according to tape hub sizes, are set forth to provide a more thorough understanding of the present invention. It will be apparent, however, to one skilled in the art, that the present invention may be practiced without these specific details.

The term "end position" of the tape used in the present invention, indicates an end part of the tape in the running direction during a forward running mode, whereas "end position" indicates a starting portion of the tape during a rewind running mode. Further, the term "hub" indicates a central part of a cassette, in which the tape is not taken up. Thus, when the hub is large the tape quantity is small (the tape quantity represents the amount of tape to be taken up by a take-up reel). A first hub has a radius of 31.02 mm and a second hub has a radius of 13.06 mm. The term "PT" indicates the number of pulses of a frequency generator of a capstan motor for one rotation of the reel. Therefore, the term "PT" indicates the rotation frequency of the reel in the tape running mode.

Figure 4A:
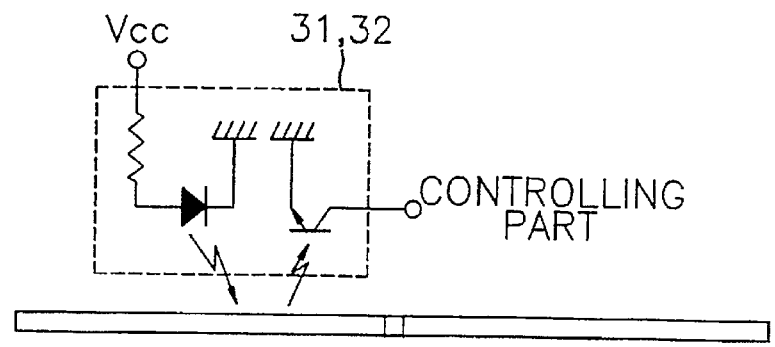
FIGS. 4A and 4B are views illustrating constructions of a sensor for sensing rotation of a reel and reflection boards.
Figure 4B:
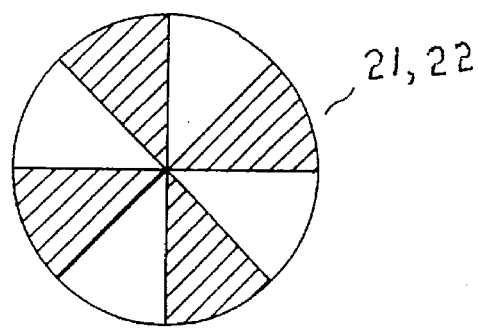

FIG. 3 is a view illustrating the construction of a device for sensing start and end positions of the tape according to the present invention. A deck includes reflection boards 21 and 22, a loading sensor 23, and a hub sensor 24. The reflection board 21 is installed in the supply reel to rotate along with the supply reel. The reflection board 22 is installed in the take-up reel to rotate along with the take-up reel. As shown in FIG. 4B, the reflection boards 21 and 22 are divided into opaque and transparent parts. Further, the reflection boards 21 and 22, as shown in FIG. 4A, are sensed by the respective light emitting element and light receiving element of the reel sensors 31 and 32. The loading sensor 23 is positioned in the deck. When the tape is inserted and loading is completed, the loading sensor 23 is also turned on and generates a loading sensing signal. The loading sensor 23 can be embodied by a magnetic switch. The hub sensor 24 senses and outputs the size of the hub of the loaded tape. The reel sensors 31 and 32, as shown in FIG. 4A, are composed of a light emitting element and a light receiving element. The light emitting element and the light receiving element generate a pulse signal according to the rotation of the reflection boards 21 and 22. Therefore, the output pulse signals of the reel sensors 31 and 32 become the rotation signal of the reels. The capstan servo 41 controls the tape running and the speed thereof.

A controlling part 10 receives an output of each construction element and also detects the start and end positions of the tape. The controlling part 10 has a ROM for storing program and rotation frequency information of the reel in a table format, and a RAM for temporarily storing data generated during the running of the program. Further, the controlling part 10 has a first neural network and a second neural network for producing the rotation frequency of the reel according to the size of the hub. The controlling part 10 discriminates the size of the hub from the hub sensor 24 during the tape running mode to produce a reference rotation frequency according to the discriminated size of the hub. Thereafter, the controlling part 10 compares the rotation frequency of the present reel with the reference rotation frequency during the tape running mode. In the comparison, when the rotation frequency of the present reel is smaller than the reference rotation frequency, the running mode is continued and the tape continues to run. On the other hand, when the rotation frequency of the present reel is larger than the reference rotation frequency, the controlling part 10 judges the stop position of the tape and stops the tape running to thereby enter a stand-by mode.

FIG. 4A is a view illustrating a relationship between the reel sensors 31 and 32 and the reflection boards 21 and 22. FIG. 4B is a view illustrating construction of the reflection boards 22 and 23.

Figure 5:
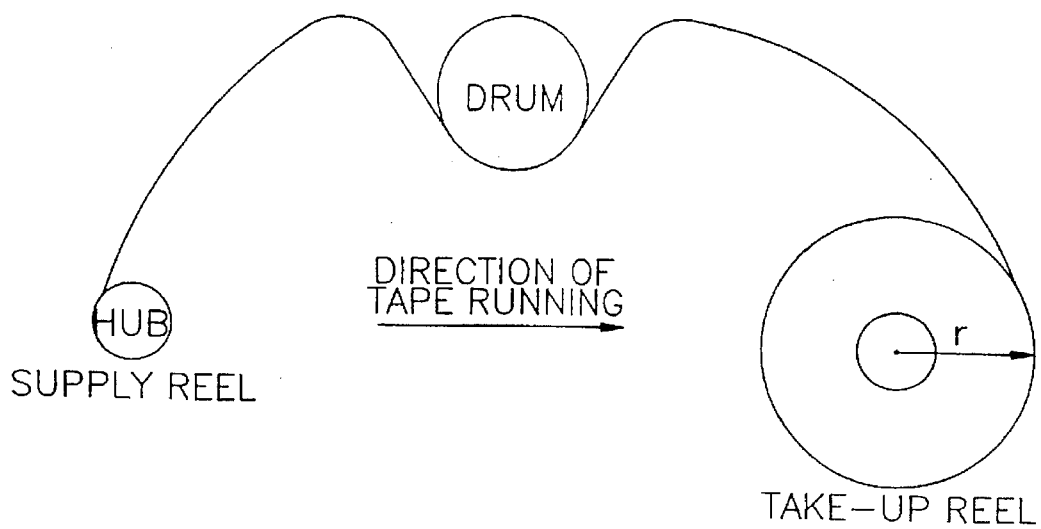
FIG. 5 is a view for explaining rotation periods of a supply reel and a take-up reel.

FIG. 5 is a view for explaining a relationship between the rotation frequency of the reel and the size of the hub of the tape.

Figure 6:
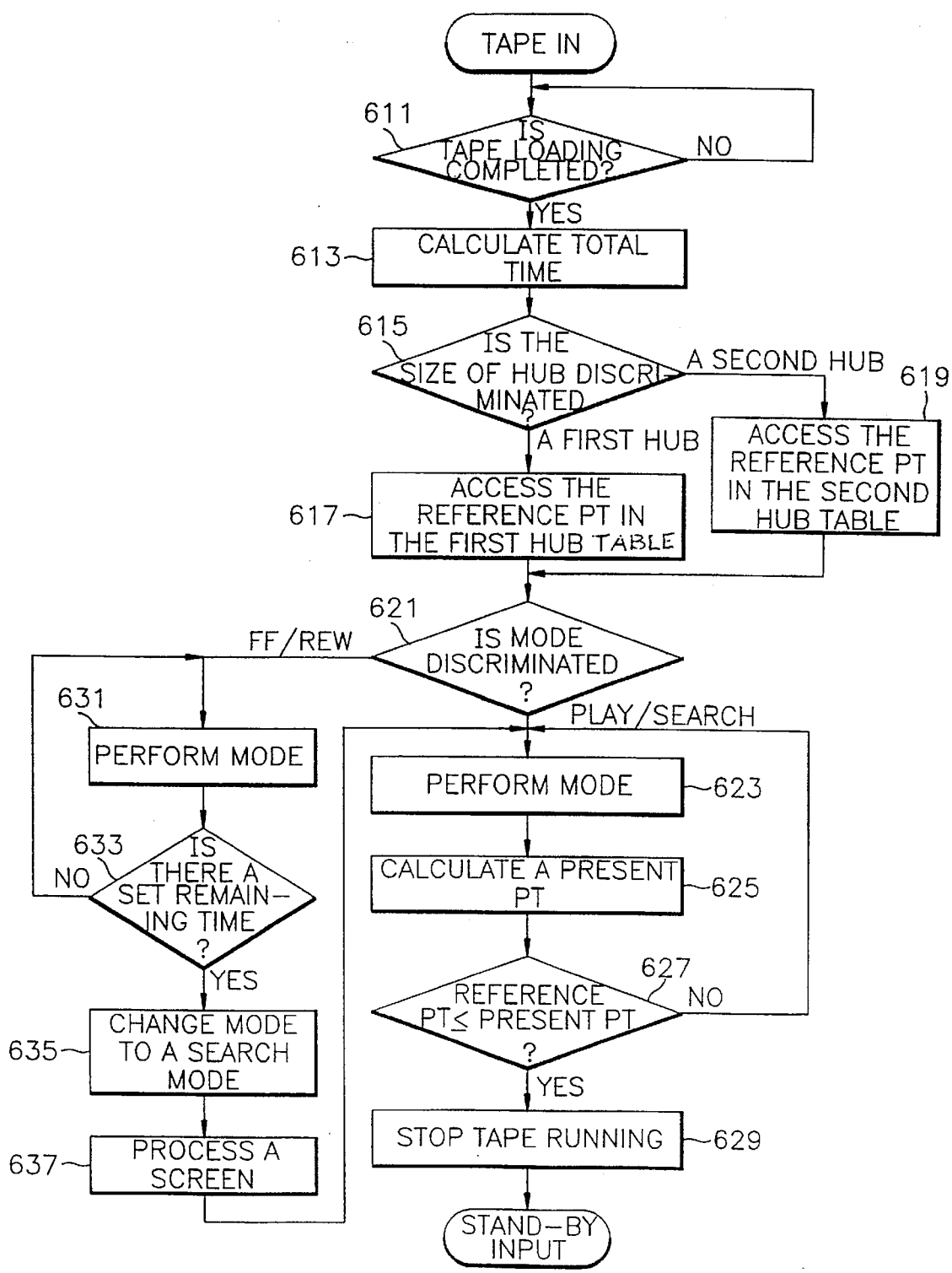
FIG. 6 is a flow chart illustrating a first embodiment in which the tape running is controlled by sensing the start and end positions of the tape according to the present invention.

FIG. 6 is a flow chart illustrating a first embodiment of the present invention, in which the tape running is controlled by detecting the start and end positions of the tape. In FIG. 6, there are provided steps of: discriminating the size of the hub during the insertion of the tape; calculating the number of reference pulses corresponding to one rotation of the reel in the end position of the tape according to the size of the hub discriminated above; checking the tape running mode; performing a normal running mode when the normal running mode is determined in the above running mode checking step to thus detect the rotation frequency of the present reel; repeatedly performing the running mode in the case where the rotation frequency of the present reel is compared with the reference frequency and the rotation frequency of the present reel is determined to be less than the reference frequency; judging the stopping position of the tape when the rotation frequency of the present reel is larger than the reference frequency in the above comparison, and stopping the tape running to thereby enter the stand-by mode; in the case when the tape running mode is a fast one in the above running mode checking step, repeatedly performing the fast tape running mode until a set remaining tape running time is reached, at which time the fast running mode is changed into the normal running mode and the normal running mode is performed.

Figure 7:
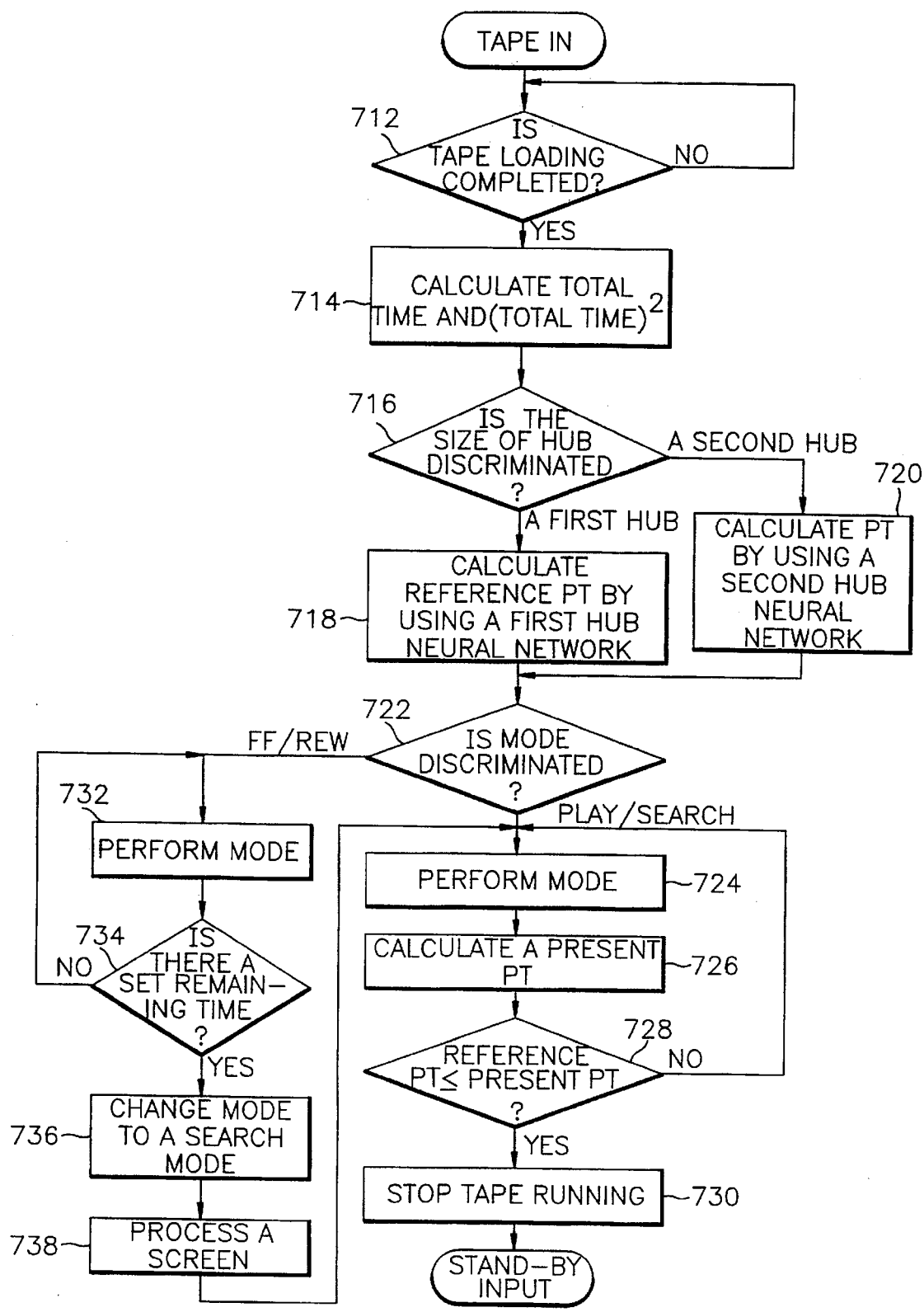
FIG. 7 is a flow chart illustrating a second embodiment in which the tape running is controlled by sensing the start and end positions of the tape according to the present invention.

FIG. 7 is a flow chart illustrating the second embodiment of the present invention, in which the first and second neural networks for first and second size hubs are included and the start and end positions of the tape are thereby detected.

FIG. 7 includes steps of: calculating a total time and a (total time)$^2$ as a variable of the neural network when a tape is inserted; determining the size of the hub; if the first hub size is determined, calculating the number of reference pulses in the end position of a first hub tape by calculating the driving variable of the first neural network; if the second hub size is determined, calculating the number of reference pulses in the end position of a second hub tape by calculating the driving variable of the second neural network; checking a tape running mode; when a normal running mode is determined in the running mode checking step, performing the normal running mode and detecting rotation frequency of the present reel; comparing the number of pulses of the present reel and the number of reference pulses, and if the number of pulses of the present reel is less than the number of reference pulses, continuously performing the running mode for the tape running; but if the number of pulses of the present reel is larger than the number of reference pulses, judging a stopping position of the tape and stopping the tape running to thereby enter a stand-by mode; in the case of a fast running mode being determined in the running mode checking step, continuously performing a fast running mode until a set remaining running time arrives, at which time the fast running mode is changed to a normal running mode and the normal running mode is then performed.

The tape running control operation is as follows. The tape running mode is divided into a forward running mode and a rewind running mode. Further, the reels are classified as a supply reel for supplying the tape and as a take-up reel for taking up the supplied tape. The tape running control operation explained in the present invention is performed as the normal running mode.

The size of the hub varies according to the length of the magnetic area of the tape and the length of the tape determines the tape playing time. Thus, in the case where the tape playing time is long, the size of the hub of the tape is small, whereas in the case where the tape playing time is short, the size of the hub is large. In general, a VHS standard tape uses two kinds of hubs, one kind having a radius of 31.02 mm and the other kind having a radius of 13.06 mm. The hub having a radius of 31.02 mm is hereinafter called a first hub and the hub having a radius of 13.06 mm is hereinafter called a second hub.

The rotation time of the reel rotated in the end position of the tape differs according to the size of the hub. That is, the rotation time of the reel of the tape having the first hub is longer than that of the reel of the tape having the second hub.

The tape running control operated by using reference data will be explained in detail hereinafter.

In general, in the case where a tape is running in a VCR, the reel to which power is provided is stably rotated. However, the rotation period of the reel to which power is not provided changes according to the length of the tape. That is, as shown in FIG. 5, the rotation period of the reel to which the power of the capstan motor is provided changes depending upon the quantity of tape taken up around the reel. At this time, the tape quantity taken up around the reel is the same as the radius "r" of the tape from the center of the hub. As shown in FIG. 5, when the entire tape is taken up in the take-up reel, the rotation period of the take-up reel in the end position of the tape is the same for similar tapes. Also, in the case where the entire tape is taken up in the supply reel, the rotation period of the supply reel is the same for similar tapes.

The method for detecting the rotation period of the reel is to attach the reflection boards 22 and 23 to the lower flange of the reel and to then calculate an output of the frequency generator of the capstan motor for one rotation of the reflection boards 22 and 23. That is, the capstan motor controls the tape running and the frequency generator of the capstan motor generates a round pulse FG according to the tape running. Therefore, if the controlling part 10 is supplied with the number of intervals between the reflection boards 22 and 23, it is possible to determine one rotation of the reel by counting the number of pulses associated with the rotation of the reel from the reel sensors 31 and 32. Further, it is possible to count the number of FG pulses generated from the frequency generator of the capstan motor during one rotation of the reel. Here, the number of FG pulses of the capstan motor per one rotation of the reel is called "PT".

In the case that "PT" is exactly measured in the end position for each kind of tape and the measurement is then learned by using the neural network, since the "PT" depends on the total time of the tape in the end position of the tape, it is possible to produce the PT in the end position of the tape under a function approximation determined by the neural network, even if a tape having an unmeasured length is used. In order to perform the above operation, there should be provided a method to determine the total running time of each different length of tape. Such a method is employed in a general VCR.

The "PT" measured in the end position of the tape for different times according to the two standard VHS hub sizes is as follows.

TABLE 1

(First hub having a radius of 31.02 mm)

| Total time calculated in VCR | PT in the end position of the tape |
| --- | --- |
| 5 | 6539 |
| 15 | 6938 |

TABLE 1-continued (First hub having a radius of 31.02 mm)

| Total time calculated in VCR | PT in the end position of the tape |
| --- | --- |
| 21 | 7134 |
| 32 | 7505 |
| 40 | 7767 |
| 49 | 8037 |
| 61 | 8405 |

TABLE 2

(Second hub having a radius of 13.06 mm)

| Total time calculated in VCR | PT in the end position of the tape |
| --- | --- |
| 86 | 7062 |
| 98 | 7491 |
| 109 | 7864 |
| 121 | 8216 |
| 133 | 8592 |
| 140 | 8790 |
| 143 | 8863 |

The second embodiment of the present invention obtains the PT using the neural network. A representative model of the learning neural network used in the present invention is an error back-propagation model. The error back-propagation model has an input/output construction as shown in FIG. 8.

Figure 8:
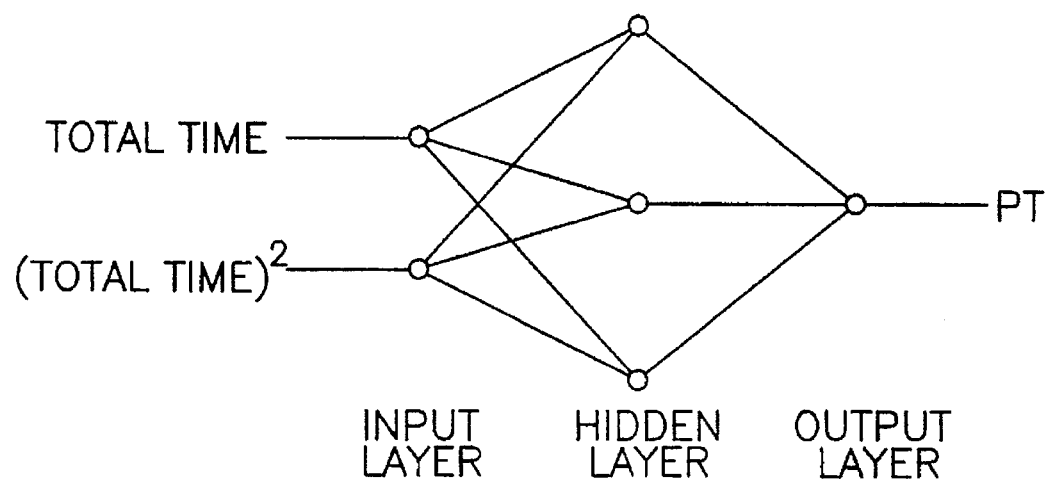
FIG. 8 is a view illustrating a construction of an error back-propagation model which is one of the neural networks used in the present invention.

Since the error back-propagation model has supervised learning, when extracting learning data by using a neural network constructed as shown in FIG. 8, it is required to extract data corresponding to an input layer and an output layer. Here, the tape used for extracting the data should be a standard VHS. In order to extract the learning data, it is necessary to extract the total time, the (total time)$^2$, and the PT data. After inserting the VHS standard tape into the VCR, it is possible to first extract the total time calculated by a production algorithm of the total length of the tape in the VCR. Secondly, it is possible to obtain the (total time)$^2$ by multiplying the total time extracted in the above. Thirdly, in order to obtain the PT data, it is necessary to run the VHS standard tape inserted into the VCR until the end position of the tape, so that the PT data can be obtained at the end position of the tape. Thereafter, the data extracted in the first, second and third processes is considered as one data pattern for neural network learning. This operation is performed for all standard VHS tapes.

Next, the extracted learning data, i.e., the total time, the (total time)$^2$, and the PT, are input to the back-propagation model shown in FIG. 8 and learned by a computer. Further, a value of a connection weight between each layer is calculated when each learning process is finished. The controlling part 10 stores the calculated value of the connection weight in a table memory, which may be a ROM.

When the learning described above is completed, since the neural network has an approximation characteristic function, it is possible to produce outputs of the learned data for the learned VHS standard tape. Also, it is possible to calculate the appropriate output for unlearned tapes.

In the case where the tape running is controlled by using a neural network without a sensor, the neural network should be embodied according to the size of the hub of the tape.

Therefore, in the present invention, there are provided a first neural network for controlling the tape running for the first hub having a radius of 31.02 mm and a second neural network for controlling the tape running for the second hub having a radius of 13.06 mm.

As shown in the above tables 1 and 2, in the case where data of the first hub is learned in the first neural network and data of the second hub is learned in the second neural network, it is possible to obtain data shown in Table 3 and Table 4. Here, the (total time)$^2$ is added to improve input information of the neural network.

TABLE 3

(First hub)

| Total time | (Total time)$^2$ | PT |
| --- | --- | --- |
| 5 | 25 | 6545 |
| 15 | 225 | 6924 |
| 21 | 441 | 7141 |
| 32 | 1024 | 7510 |
| 40 | 1600 | 7762 |
| 49 | 2401 | 8041 |
| 61 | 3721 | 8405 |

TABLE 4

(Second hub)

| Total time | (Total time)$^2$ | PT |
| --- | --- | --- |
| 86 | 7396 | 7096 |
| 98 | 9604 | 7496 |
| 109 | 11881 | 7859 |
| 121 | 14641 | 8220 |
| 133 | 17689 | 8595 |
| 140 | 19600 | 8790 |
| 143 | 20449 | 8859 |

For a 45 minute tape, when the unlearned data is input to the first neural network, the total time is given as 47, the (total time)$^2$ as 2209, and the PT as 7980. Meanwhile, the result of actual operation of the tape for 45 minutes shows that the "PT" was measured as 7981 in the end position of the tape. Therefore, the above result obtained by using the neural network is substantially the same as the result obtained by actual operation of the VCR.

Accordingly, in order to detect the end position of the tape, there are provided two methods of determining the reference PT. One of these methods is to set the PT with reference to the above Table 1 and Table 2. The other method is to set the PT by using the neural network. In the first embodiment of the present invention, as shown in Tables 1 and 2, the tape running is measured in the VCR and the obtained PT is shown in a table, so that the end position of the tape is judged on the basis of the shown PT. Further, in the second embodiment of the present invention, the reference PT is set by using the neural network, and the end position of the tape is judged on the basis of the set PT.

The operation of the first embodiment of the present invention will be explained with respect to FIG. 6. After a first hub table similar to Table 1 and a second hub table similar to Table 2 are stored according to the size of the hub, and the rotation frequency of the present reel is detected while the tape running mode is performed, the end position of the tape is determined by comparing the rotation frequency with the reference PT of the table for the respective hub. In operation, when the tape is inserted and the loading is completed, the loading sensor 23 is turned on and loading sensor 23 outputs the loading signal to the controlling part 10. The controlling part 10 recognizes the loading signal in step 611 and calculates the total time run in the VCR in step 613. The hub sensor 24 detects and outputs the size of the hub of the loaded tape, and the controlling part 10 receives the output of the hub sensor 24 in step 615 to thereby discriminate the size of the hub of the tape. The controlling part 10 analyzes whether the tape loaded by the above output is of the first hub size or the second hub size. If the inserted tape is of the first hub size, in step 617 the controlling part 10 calculates the reference PT for a first table similar to Table 1. On the other hand, if the hub size of the inserted tape is determined in step 615 to be the second hub size, in step 619 the controlling part 10 calculates the reference PT for a second table similar to Table 2.

In the meantime, the running mode is checked in step 621. There are provided a normal running mode (such as a play mode and a search mode), a fast forward mode FF, and a rewind mode REW in the tape running mode.

When the normal tape running mode is determined in step 621, the controlling part 10 controls the capstan servo 41 and then performs the normal running mode in step 623. Also, the controlling part 10 receives the pulse from the reel sensors 31 and 32 to thereby calculate the present PT in step 625. When receiving a reel pulse, as shown in FIG. 4B, the reflection boards 21 and 22 rotate depending upon the rotation of the reels. The reflection boards 21 and 22, as shown in FIG. 4A, are disposed between the light emitting element and the light receiving element of the reel sensors 31 and 32. Therefore, if the reflection boards 21 and 22 rotate, the reel sensors 31 and 32 generate the pulse signal whenever they are arranged in the opaque and transparent areas of the reflection boards 21 and 22. At this time, the controlling part 10 measures the time required for one rotation by counting the reel pulses. Thus, during the forward mode, the controlling part 10 receives the rotation pulse of the take-up reel which is outputted from the reel sensor 32.

As mentioned above, after calculating the present PT, the controlling part 10 compares the present PT calculated in step 627 with the reference PT read from the table. At this time, if the present PT is smaller than the reference PT the flow proceeds to step 623, since there is tape yet to be run. The controlling part 10 repeatedly performs the above operation in step 623, so that it is possible to reach the end of the tape. If the present PT and the reference PT are judged to be equal in step 627, or if the present PT is judged to be larger than the reference PT, the controlling part 10 recognizes the above condition and controls the capstan servo 41 to thereby stop the tape running. Next, the controlling part 10 enters the stand-by mode for the next key input.

Further, in case of a fast running mode, the controlling part 10 recognizes the fast running mode in step 621 and performs the fast running mode in step 631. At this time, it is difficult to calculate the PT since the tape running is performed at high speed in the FF mode or the REW mode. Hence, if the remaining tape quantity is less than a quantity corresponding to a set time, the fast running mode is converted into the normal running mode to calculate the PT. Here, if it is assumed that the set remaining time is 5 minutes, the controlling part 10 performs steps 631 and 633 during the fast running mode and then repeatedly performs the fast running mode until the remaining tape running time is 5 minutes. When the remaining tape running time is 5 minutes, the controlling part 10 recognizes the set remaining time in step 633 and thereby changes the running mode to the search mode in step 635. Thereafter, the controlling part 10 processes a screen with one color (for example, a blue screen) in step 637. Then, the flow proceeds to step 623. As a normal running mode, the search mode can produce the PT in a mode for searching the screen at a speed of four times the play mode.

As discussed above, if the fast running mode is changed to the normal running mode, the controlling part 10 produces the present PT through the above steps and compares the produced PT with the reference PT to thereby check whether the tape is in an end position. Then, the controlling part 10 controls the tape running.

The second embodiment of the present invention will be explained with respect to FIG. 7. Two methods for controlling the tape running are provided in the second embodiment of the present invention. In the first method, the learning of the neural network is programmed by the controlling part 10. In the second method, a table is produced in which a pair of corresponding PTs are entered for each one minute interval. Further, after the reference PT is obtained through the neural network and while the tape running is being performed, the controlling part 10 detects the rotation frequency of the present reel and compares the rotation frequency thereof with a reference PT to discriminate the end position of the tape.

In the operation of the second embodiment of the present invention, the total time and the (total time)$^2$ of the inserted tape are calculated in step 714. Then, the flow proceeds to step 716 where the size of the hub is determined. At that time, if the first hub size is determined, the reference PT of the first hub is calculated in step 718 using the first neural network. On the other hand, if the second hub size is determined, the reference PT of the second hub is calculated in step 720 using the second neural network. The reference PT calculated by using the first neural network produces results as shown in Table 3 and the reference PT calculated by using the second neural network produces results as shown in Table 4.

In the meantime, the operations in steps 722 to 738 are performed in the same manner as in the first embodiment. That is, after calculating the reference PT, if the tape has been continuously run, the controlling part 10 compares the present PT with the reference PT. At this time, if the present PT is the same as or larger than the reference PT, the controlling part 10 checks the end position of the tape to thereby stop the tape running. Further, since it is impossible to measure the PT in the FF mode or the REW mode, controlling part 10 repeatedly performs the tape running control operation by changing the mode to the search mode when the remaining time is down to 5 minutes.

As mentioned above, the tape running control method of the present invention stops the tape running in the start and end positions without using a sensor. Further, the present invention increases efficiency because tape running is stably controlled according to the size of the hub of the tape.

What is claimed is:

1. A tape running control method for use in a tape driving apparatus for storing in a table a reference pulse value which corresponds to rotation of a reel in an end position of a tape and which depends upon a size of a hub, said method comprising the steps of:

determining the size of said hub;

extracting from the table the reference pulse value which corresponds to one rotation of said reel in said end position of said tape in accordance with the size of said hub determined in the size determining step;

detecting a frequency of rotation of said reel during a tape running mode;

determining a number of pulses corresponding to capstan rotation for each rotation of said reel;

comparing the number of pulses corresponding to capstan rotation of said reel and the reference pulse value, and, if the number of pulses corresponding to capstan rotation for each rotation of said reel is less than the reference pulse value, repeatedly performing said running mode for said tape running, and, if the number of pulses corresponding to capstan rotation for each rotation of said reel is larger than the reference pulse value, judging a stopping position of said tape and stopping the tape running to thereby enter a stand-by mode.

2. A tape running control method for use in a tape driving apparatus for storing in a table a reference pulse value which corresponds to rotation of a reel in an end position of a tape and which depends upon a size of a hub, said method comprising the steps of:

determining the size of said hub;

accessing in the table the reference pulse value which corresponds to one rotation of said reel in said end position of said tape in accordance with the size of said hub determined in the size determining step;

ascertaining a tape running mode, and if the tape running mode is ascertained to be a normal tape running mode, performing said normal running mode and detecting a frequency of rotation of said reel;

determining a number of pulses corresponding to capstan rotation for each rotation of said reel;

comparing the number of pulses corresponding to capstan rotation for each rotation of said reel and the reference pulse value, and, if said number of pulses corresponding to capstan rotation for each rotation of said reel is less than the reference pulse value, repeatedly performing said running mode for said tape running, and, if the number of pulses corresponding to capstan rotation for each rotation of said reel is larger than the number of reference pulses, judging a stopping position of said tape and stopping the tape running to thereby enter a stand-by mode;

if the tape running mode is ascertained to be a fast running mode in the ascertaining step, repeatedly performing the fast running mode until a time arrives at which a remaining running time of the tape is a predetermined value; and when said time arrives at which the remaining running time of the tape is the predetermined time, changing said fast running mode to the normal running mode and then performing the normal running mode.

3. The tape running control method as claimed in claim 2, wherein said normal running mode is one of a play mode and a search mode, and said fast running mode is one of a fast forward mode and a rewind mode.

4. A tape running control method in a tape driving apparatus having a first neural network associated with a first hub size and a second neural network associated with a second hub size, said method comprising the steps of:

calculating a total running time of a tape as a first variable of said first and second neural networks and calculating a square of the total running time of the tape as a second variable of said first and second neural networks;

determining a size of a hub of said inserted tape;

if the size of the hub is determined to be the first size in the size determining step, calculating a first number of reference pulses in an end position of a first hub tape as a third variable of said first neural network, said third variable of said first neural network being calculated while said first hub tape is running, and if the size of the hub is determined to be the second size in the size determining step, calculating a second number of reference pulses in an end position of a second hub tape as a third variable of said second neural network, said third variable of said second neural network being calculated while said second hub tape is running;

ascertaining a tape running mode, and if the tape running mode is ascertained to be a normal tape running mode, performing said normal running mode and detecting a frequency of rotation of a reel containing said inserted tape;

determining a number of pulses corresponding to capstan rotation for each rotation of said reel;

establishing as a comparison number of reference pulses one of the first number of reference pulses and the second number of reference pulses, according to whether the size of the hub is determined to be the first size or the second size, respectively, in the size determining step;

comparing said number of pulses corresponding to capstan rotation for each rotation of said reel and the comparison number of reference pulses, and if said number of pulses corresponding to capstan rotation for each rotation of said reel is smaller than said comparison number of reference pulses, repeatedly performing said running mode for said tape running, and if said number of pulses corresponding to capstan rotation for each rotation of said reel is larger than said comparison number of reference pulses, judging a stopping position of said tape and stopping said tape running to thereby enter a stand-by mode;

if the tape running mode is ascertained to be a fast running mode in the ascertaining step, repeatedly performing the fast running mode until time arrives at which a remaining running time of the tape is a predetermined time; and when a said time arrives at which the remaining running time of the tape is the predetermined time, changing said fast running mode to a normal running mode and then performing said normal running mode.

5. The tape running control method as claimed in claim 4, wherein said normal running mode is one of a play mode and a search mode, and said fast running mode is one of a fast forward mode and a rewind mode.

* * * * *